United States Patent
Folke et al.

(10) Patent No.: US 10,588,142 B2
(45) Date of Patent: *Mar. 10, 2020

(54) COORDINATION BETWEEN PROSE BSR AND CELLULAR BSR

(71) Applicant: TELEFONAKTIEBOLAGET L M ERICSSON (PUBL), Stockholm (SE)

(72) Inventors: Mats Folke, Luleå (SE); Yunxi Li, Järfälla (SE); Magnus Stattin, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/037,665

(22) Filed: Jul. 17, 2018

(65) Prior Publication Data
US 2018/0324838 A1    Nov. 8, 2018

Related U.S. Application Data

(63) Continuation of application No. 14/817,661, filed on Aug. 4, 2015, now Pat. No. 10,057,918.
(Continued)

(51) Int. Cl.
*H04W 72/12* (2009.01)
*H04W 72/14* (2009.01)
(Continued)

(52) U.S. Cl.
CPC ... *H04W 72/1268* (2013.01); *H04W 28/0278* (2013.01); *H04W 72/1284* (2013.01); *H04W 76/14* (2018.02)

(58) Field of Classification Search
CPC combination set(s) only.
See application file for complete search history.

(56) References Cited

U.S. PATENT DOCUMENTS 9,930,690 B2 * 3/2018 Al-Shalash ....... H04W 72/1284
10,057,918 B2 * 8/2018 Folke .................. H04W 76/14
(Continued)

FOREIGN PATENT DOCUMENTS

WO    2014 109558 A1    7/2014

OTHER PUBLICATIONS

3rd Generation Partnership Project; Technical Specification Group Services and System Aspects; Service requirements for the Evolved Packet System (EPS) (Release 12). 3GPP TS 22.278 V12.1.0 (Jun. 2012).
(Continued)

*Primary Examiner* — Yee F Lam
(74) *Attorney, Agent, or Firm* — Baker Botts, LLP

(57) ABSTRACT

A method in a wireless device is disclosed. The method comprises sending a scheduling request to a network node, and receiving, from the network node in response to the scheduling request, a grant of uplink resources. The method further comprises determining whether the granted uplink resources are at least equal to or larger than the resources required for transmission of both a buffer status report (BSR) and a sidelink BSR, and upon determining that the granted uplink resources are at least equal to or larger than the resources required for transmission of both the BSR and the sidelink BSR, communicating the BSR and the sidelink BSR to the network node in a single medium access control (MAC) protocol data unit (PDU).

30 Claims, 11 Drawing Sheets

Related U.S. Application Data

(60) Provisional application No. 62/035,091, filed on Aug. 8, 2014.

(51) Int. Cl.
    *H04W 28/02*     (2009.01)
    *H04W 76/14*     (2018.01)

(56) References Cited

U.S. PATENT DOCUMENTS

| | | | |
|---|---|---|---|
| 10,206,221 B2 * | 2/2019 | Takahashi | H04W 72/1242 |
| 2009/0052388 A1 * | 2/2009 | Kim | H04W 74/002 |
| | | | 370/329 |
| 2010/0035581 A1 * | 2/2010 | Park | H04W 74/08 |
| | | | 455/412.1 |
| 2014/0023008 A1 | 1/2014 | Ahn et al. | |
| 2015/0326484 A1 * | 11/2015 | Cao | H04W 4/70 |
| | | | 370/329 |
| 2016/0135155 A1 * | 5/2016 | Al-Shalash | H04W 72/1284 |
| | | | 370/329 |
| 2016/0381595 A1 * | 12/2016 | Lee | H04W 28/0278 |
| | | | 370/329 |
| 2017/0188349 A1 * | 6/2017 | Lee | H04W 76/14 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 12)3GPP TS 36.321 v12.2.1. (Jun. 2014).

Alcatel-Lucent et al. BSR for D2D. 3GPP Draft; R2-142587 D2DBSRDDRB-V01, 3rd Generation Partnership Project (3GPP), Mobile Competence Centre ; 650, Route Des Lucioles ; F-06921 Sophia-Antipolis Cedex; France. vol. RAN WG2, No. Seoul, Korea; 20140519-28140523. May 19, 2014.

Huawei et al. Design of 020 BSR and 020 MAC PDU. 3GPP Draft; R2-142742 Design of 020 BSR and D2D MAC PDU, 3rd Generation Partnership Project (3GPP), Mobile Competence Centre ; 650, Route Des Lucioles ; F-06921 Sophia-Antipolis Cedex; France, vol. RAN WG2, No. Seoul, Korea; 20140519-28140523. May 28, 2014.

Ericsson. Layer 2 procedures for D2DCommunication. 3GPP Draft; R2-141256—Layer 2 Procedures for D2D Communication, 3rd Generation Partnership Project (3GPP), Mobile Competence Centre ; 650, Route Des Lucioles ; F-06921 Sophia-Antipolis Cedex; France. vol. RAN WG2, No. Valencia, Spain; Mar. 31, 2014-Apr. 4, 2014. Mar. 22, 2014.

* cited by examiner

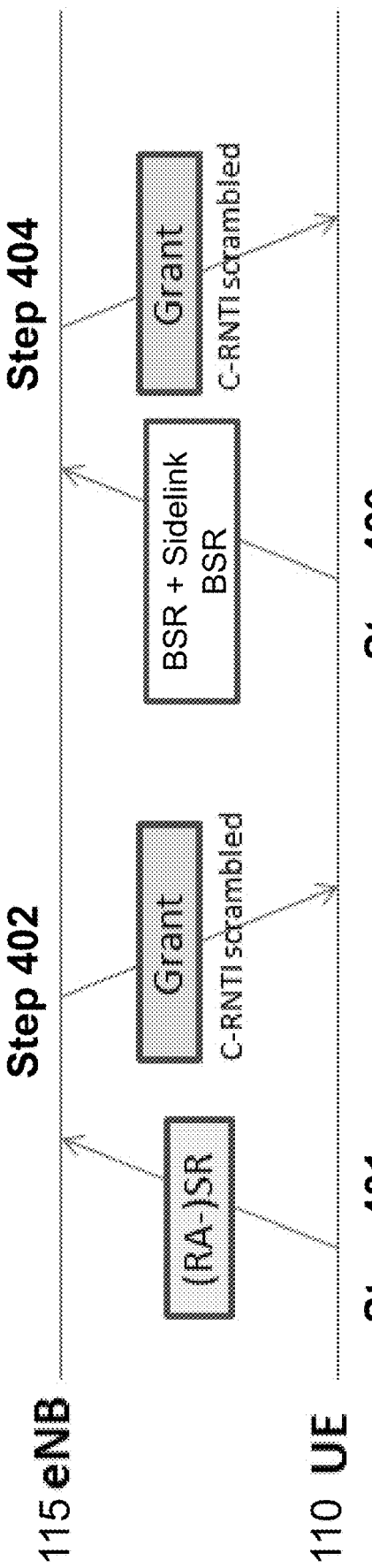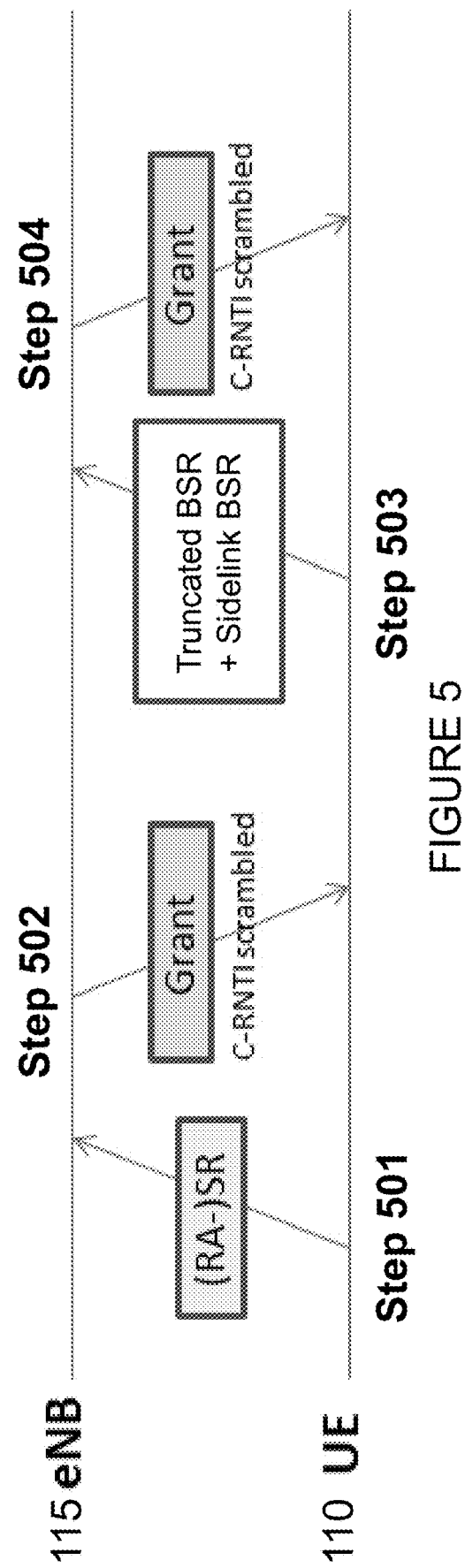

COORDINATION BETWEEN PROSE BSR AND CELLULAR BSR

RELATED APPLICATIONS

This application is a continuation of patent application Ser. No. 14/817,661, filed Aug. 4, 2015, which claims the benefit of provisional patent application Ser. No. 62/035,091, filed Aug. 8, 2014, the disclosures of which are hereby incorporated herein by reference in their entirety.

TECHNICAL FIELD

The present disclosure relates, in general, to wireless communications and, more particularly, to coordination between prose BSR and cellular BSR.

BACKGROUND

Device-to-device (D2D) communication (which may interchangeably referred to herein as proximity services (ProSe) or sidelink communication) is a well-known and widely used component of many existing wireless technologies, including ad hoc and cellular networks. Examples include Bluetooth and several variants of the IEEE 802.11 standards suite, such as WiFi Direct. These systems operate in unlicensed spectrum.

Recently, D2D communications as an underlay to cellular networks have been proposed as a means to take advantage of the proximity of communicating devices and at the same time to allow devices to operate in a controlled interference environment. Typically, it is suggested that such D2D communications share the same spectrum as the cellular system, for example by reserving some of the cellular uplink resources for D2D purposes. Another possibility is allocating dedicated spectrum for D2D purposes. Allocating dedicated spectrum for D2D purposes is a less likely alternative, however, as spectrum is a scarce resource and (dynamic) sharing between the D2D services and cellular services is more flexible and provides higher spectrum efficiency.

Devices that want to communicate, or even just discover each other, typically need to transmit various forms of control signaling. One example of such control signaling is the so-called (discovery) beacon signal, which at least carries some form of identity and is transmitted by a device that wants to be discoverable by other devices. Other devices can scan for the beacon signal and, once they have detected the beacon, can take appropriate action—such as trying to initiate a connection setup with the device transmitting the beacon. For certain communication modes (such as connectionless communication, which is typically employed for group-cast and broadcast transmission), the beacon signal might carry a scheduling assignment indicating the associated data transmission to potential receivers. Connectionless communication is typically a unidirectional communication mode that does not require acknowledged connection setup.

The ProSe Study Item 3GPP TR 36.843 v12.0.1 recommends supporting D2D operation for out-of-network coverage user equipment (UEs). In such a case, different synchronization options are possible. As one example, UEs may synchronize to a global reference (e.g., a GPS), which is in general different from the synchronization reference of deployed networks. As another example, UEs may operate in a fully asynchronous fashion (i.e., no synchronization reference, at least for discovery). Yet another option is that clusters of UEs may synchronize to a specific UE (in the following referred to as Cluster Head (CH)), which provides local synchronization to its neighbor UEs. Different clusters are not necessarily synchronized. If out-of-network coverage synchronization is based on sync signals transmitted by CHs, it is necessary that UEs synchronize to the suitable synchronization reference (i.e., CH). A number of procedures may be considered, with some similarities to cell search in cellular networks, in which idle UEs search for sync signals from different cells and synchronize to, for example, the cell with the best signal strength. Similarly, ProSe enabled out of network coverage UEs might synchronize to the strongest CH in proximity.

UEs may discover unsynchronized beacons on a given carrier (or sub-band) by searching for discovery beacons in time over their configured/predefined resources. This can be done, for example, by time domain correlation of the received signal with the beacon's waveforms, similar to the way UEs search for cells using primary/secondary synchronization signal (PSS/SSS). UEs alternate wake-up and sleep cycles for reducing power consumption (i.e., discontinuous reception (DRX)). During sleep periods, only the memory and clocks are active, but the UE is unable to receive any signal. During wake-up time, the receiver is on. It is essential that the wake-up time periods are as narrow as possible compared to the sleep time in order to save battery.

Looking at coverage in a bit more detail, there are basically three different cases. In the first case, all communicating UEs are within network coverage. In this case, the network also controls the D2D communication, such as synchronization, scheduling, etc. In the next case, all communicating UEs are outside network coverage. In this context, out-of-coverage may mean that the UE is unable to successfully communicate with any cellular network which may act as support to ProSe operations, but other definitions of out-of-coverage are possible. In the out-of-coverage case, the UEs will mostly rely on pre-configured information (i.e., information that was obtained when the UE was connected to a network). With the use of beacons and scheduling requests/grants, other information is exchanged, such as synchronization and resources to use. A third case, partial coverage, results when some of the communicating UEs are within network coverage and some are not. The difficult case occurs when the receiving UE is within coverage (including either case that the transmitting UE is in or out-of-coverage). In such a case, it may be that the receiving UE communicated on the UL with the eNB; communication which will prevent the UE from receiving the broadcast from the UE out of coverage.

To better coordinate interference, the scheduling of D2D transmissions can be coordinated by the eNB when UEs are in network coverage. In order for the eNB to better assign a correct amount of transmission resources, the UEs send ProSe buffer status reports (BSRs) to the eNB. A similar mechanism exists for coordination of uplink transmissions. The ProSe BSR contains information about the amount of data currently available for transmission on the sidelink interface. As the UE may have some data available for transmission on the sidelink interface as well as some data available for transmission on the uplink interface, there may be occurrences when the UE transmits both a ProSe BSR and an ordinary BSR. According to existing solutions, a UE performs buffer status reporting serially (i.e., the UE performs buffer status reporting for uplink and then sidelink, or vice versa, with only one buffer status report per MAC PDU). Such a solution may have certain deficiencies. For example, performing buffer status reporting serially delays network awareness of UE status, and may cause a service delay as a result of requesting/allocating resources for the UE's uplink data followed by the sidelink data.

SUMMARY

To address the foregoing problems with existing solutions, disclosed is a method in a wireless device. The method comprises sending a scheduling request to a network node and receiving, from the network node in response to the scheduling request, a grant of uplink resources. The method further comprises determining whether the granted uplink resources are at least equal to or larger than the resources required for transmission of both a buffer status report (BSR) and a sidelink BSR, and upon determining that the granted uplink resources are at least equal to or larger than the resources required for transmission of both the BSR and the sidelink BSR, communicating the BSR and the sidelink BSR to the network node in a single medium access control (MAC) protocol data unit (PDU).

In certain embodiments, the method may further comprise upon determining that the granted uplink resources are not at least equal to or larger than the resources required for transmission of both the BSR and the sidelink BSR, communicating the BSR and a truncated sidelink BSR to the network node in a single MAC PDU. The method may further comprise upon determining that the granted uplink resources are not at least equal to or larger than the resources required for transmission of both the BSR and the sidelink BSR, communicating a truncated BSR and the sidelink BSR to the network node in a single MAC PDU. The method may further comprise upon determining that the granted uplink resources are not at least equal to or larger than the resources required for transmission of both the BSR and the sidelink BSR, communicating a truncated BSR and a truncated sidelink BSR to the network node in a single MAC PDU. In certain embodiments, communicating the BSR and the sidelink BSR to the network node in a single MAC PDU may comprise communicating a combined BSR, the combined BSR comprising a single sub-header component and indicating buffer status for both LTE logical channels and sidelink logical channels.

In certain embodiments, the BSR may indicate an amount of data available for transmission in an uplink buffer associated with the wireless device, and the sidelink BSR may indicate an amount of sidelink data available for transmission in a sidelink buffer of the wireless device. The method may further comprise upon determining that the granted uplink resources are not at least equal to or larger than the resources required for transmission of both the BSR and the sidelink BSR, determining an amount of additional resources needed to include the sidelink BSR in a subsequent uplink transmission, reporting, to the network node, an increased amount of data available for transmission, the increased amount of data available for transmission including the determined amount of additional resources needed to include the sidelink BSR in the subsequent uplink transmission, and communicating, in the subsequent uplink transmission, the sidelink BSR and the amount of data reported to be available for transmission.

Also disclosed is a wireless device. The wireless device comprises one or more processors. The one or more processors are configured to send a scheduling request to a network node and receive, from the network node in response to the scheduling request, a grant of uplink resources. The one or more processors are configured to determine whether the granted uplink resources are at least equal to or larger than the resources required for transmission of both a buffer status report (BSR) and a sidelink BSR, and upon determining that the granted uplink resources are at least equal to or larger than the resources required for transmission of both the BSR and the sidelink BSR, communicate the BSR and the sidelink BSR to the network node in a single medium access control (MAC) protocol data unit (PDU).

Also disclosed is a method in a network node. The method comprises receiving a scheduling request from a wireless device and sending, in response to receiving the scheduling request, a grant of uplink resources to the wireless device. The method further comprises receiving, from the wireless device in response to the grant of uplink resources, a buffer status report (BSR) and a sidelink BSR in a single medium access control (MAC) protocol data unit (PDU).

The BSR may indicate an amount of data available for transmission in an uplink buffer associated with the wireless device. The sidelink BSR may indicate an amount of sidelink data available for transmission in a sidelink buffer of the wireless device. In certain embodiments, the granted uplink resources may be at least equal to or larger than the resources required for transmission by the wireless device of both a BSR and a sidelink BSR. In certain embodiments, the granted uplink resources may not be at least equal to or larger than the resources required for transmission by the wireless device of both the BSR and the sidelink BSR, and the received BSR may comprise a truncated BSR, the truncated BSR indicating to the network node that the wireless device needs additional resources to complete buffer status reporting. The granted uplink resources may not be at least equal to or larger than the resources required for transmission of both the BSR and the sidelink BSR, the received BSR may comprise a truncated BSR, and the received sidelink BSR may comprise a truncated sidelink BSR. Receiving, from the wireless device in response to the grant of uplink resources, the BSR and the sidelink BSR in a single MAC PDU may comprise receiving a combined BSR. The combined BSR may comprise a single sub-header component and indicate buffer status for both LTE logical channels and sidelink logical channels.

In certain embodiments, the granted uplink resources may not be at least equal to or larger than the resources required for transmission by the wireless device of both the BSR and the sidelink BSR, and the received sidelink BSR may comprise a truncated sidelink BSR. The truncated sidelink BSR may indicate to the network node that the wireless device needs additional resources to report buffer status for one or more logical channels of logical channel groups for which buffer status was not reported. The method may further comprise granting an amount of resources adjusted to allow the wireless device to report buffer status for the one or more logical channels of logical channel groups for which buffer status was not reported.

In certain embodiments, the granted uplink resources may not be at least equal to or larger than the resources required for transmission of both the BSR and the sidelink BSR. The method may further comprise receiving a report from the wireless device indicating an amount of data available for transmission, the amount of data available for transmission increased based on an amount of additional resources determined by the wireless device to be needed to include the sidelink BSR in a subsequent uplink transmission, and granting sufficient uplink resources so that the wireless device can include both the sidelink BSR and the amount of data reported to be available for transmission.

Also disclosed is a network node. The network node comprises one or more processors. The one or more processors are configured to receive a scheduling request from a wireless device and send, in response to receiving the scheduling request, a grant of uplink resources to the wireless device. The one or more processors are configured to receive, from the wireless device in response to the grant of uplink resources, a buffer status report (BSR) and a sidelink BSR in a single medium access control (MAC) protocol data unit (PDU).

Certain embodiments of the present disclosure may provide one or more technical advantages. For example, in certain embodiments a service delay associated with requesting/allocating resources for a UE having UL and sidelink data in buffer for transmission may be advantageously reduced or eliminated by enabling a UE to obtain sidelink and uplink resources jointly. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 4 is a signal flow diagram of the initiation of uplink and sidelink transmission using a BSR and a sidelink BSR, in accordance with certain embodiments;

FIG. 5 is a signal flow diagram of the initiation of uplink and sidelink transmission using a BSR and a truncated sidelink BSR, in accordance with certain embodiments;

DETAILED DESCRIPTION

As described above, using D2D communications as an underlay to cellular networks may provide the ability to take advantage of the proximity of communicating devices, and at the same time allow devices to operate in a controlled interference environment. Typically, it is suggested that such D2D communication share the same spectrum as the cellular system, for example by reserving some of the cellular uplink resources for D2D purposes. Buffer status reporting is a process that allows a UE to inform the network of the amount of data for transmission by the UE. In some cases, a UE may have both uplink data and sidelink data in buffer to report. Existing solutions require a UE to perform buffer status reporting serially. This may result in a service delay as a result of requesting/allocating resources for the UE's uplink data followed by the sidelink data. Moreover, both BSRs are transmitted on the uplink, and a problem arises when the eNB has not assigned the UE with enough resources to transmit both. The present disclosure contemplates various embodiments that may advantageously reduce or eliminate this service delay and other deficiencies of existing solutions by enabling a UE to obtain sidelink and uplink resources jointly.

Figure 1:
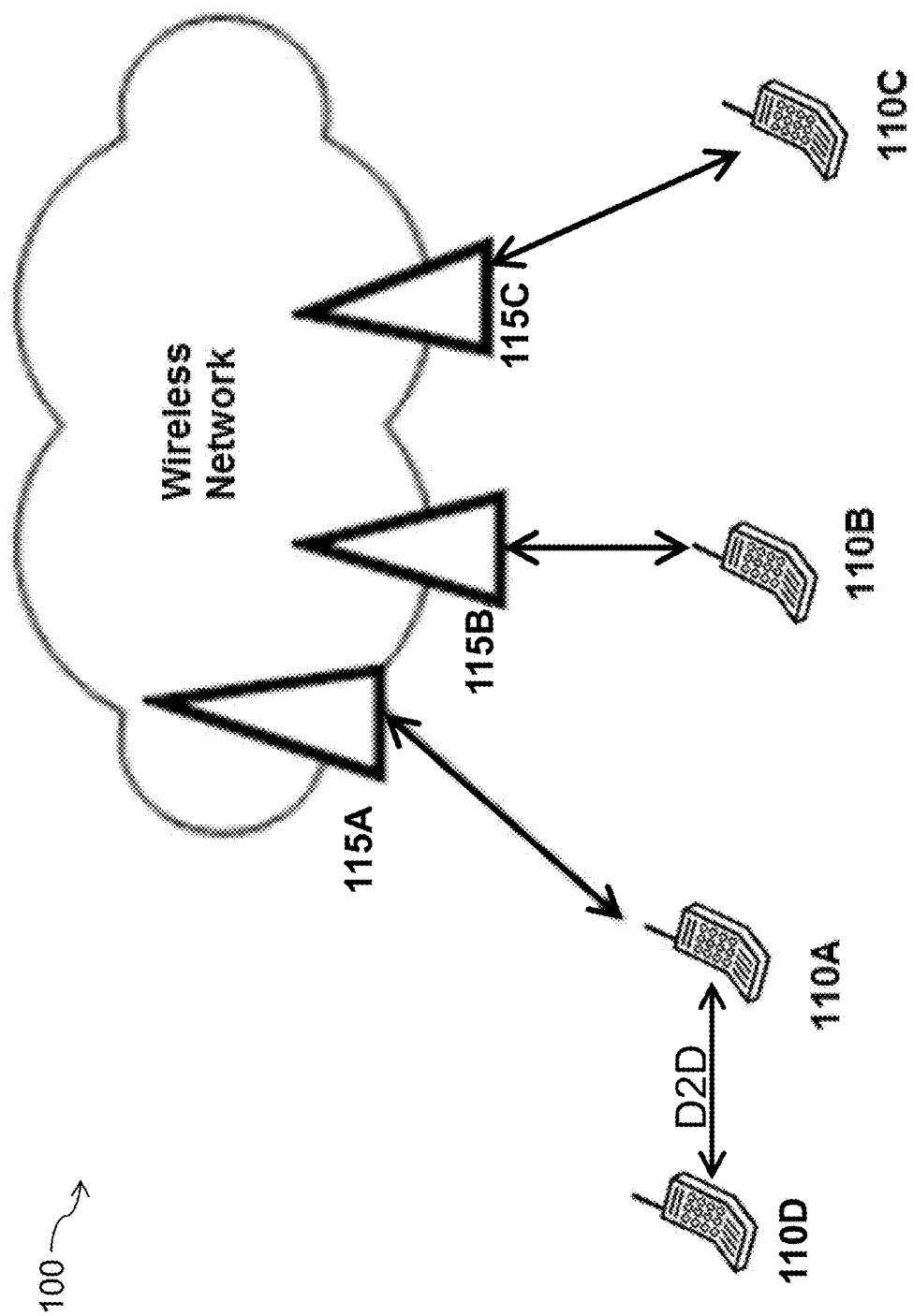
FIG. 1 is a block diagram illustrating an embodiment of a network, in accordance with certain embodiments.

FIG. 1 is a block diagram illustrating an embodiment of a network 100, in accordance with certain embodiments. Network 100 includes one or more UE(s) 110 (which may be interchangeably referred to as wireless devices 110), network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to receive signals from and/or transmit signals to UE 110D.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding.

In some embodiments, the core network node may manage the establishment of communication sessions and various other functionalities for UEs 110. In some embodiments, the core network node may manage the establishment of communication sessions and various other functionality for UEs 110. UEs 110 may exchange certain signals with core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

In some embodiments, the non-limiting term UE is used. UEs 110 described herein can be any type of wireless device capable of communicating with network nodes 115 or another UE over radio signals. UE 110 may also be a radio communication device, target device, device-to-device (D2D) UE, machine-type-communication UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), etc. Also, in some embodiments generic terminology, "radio network node" (or simply "network node") is used. It can be any kind of network node, which may comprise a base station, radio base station, base transceiver station, base station controller, network controller, evolved Node B (eNB), Node B, relay node, access point, radio access point, Remote Radio Unit (RRU), Remote Radio Head (RRH), or any other suitable network node. Example embodiments of UEs 110, network nodes 115, and other network nodes (such as radio network controller or core network node) are described in more detail with respect to FIGS. 11, 12, and 13, respectively.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE FDD/TDD, WCDMA/HSPA, GSM/GERAN, Wi Fi, WLAN, CDMA2000, or any other suitable RAT.

As described above, there are basically three different D2D communication coverage scenarios: an in-network coverage scenario; a partial-coverage scenario; and an out-of-coverage scenario. In the in-network coverage scenario, the communicating UEs 110 are within network coverage. In this case, the network also controls the D2D communication, such as synchronization, scheduling, etc. There are two types of resource allocation schemes for ProSe communication when in coverage: mode 1 and mode 2. By mode 1, UE 110 requests resources for sidelink transmission from a network node 115. For example, UE 110A may request resources for sidelink transmission from network node 115A. By mode 2, UE 110 selects resources for transmission from a known resource pool.

In some cases, when operating according to mode 1, a UE 110, such as UE 110A, may request different resources from network node 115A depending on what data is in UE buffer. For example, if UE 110A has only sidelink data in buffer, UE 110A may only request sidelink resources. If UE 110A has only uplink (UL) (e.g., LTE) data in buffer, UE 110A may only request UL resources. If UE 110A has both UL and sidelink data in buffer, UE 110A may request both UL and sidelink resources.

Figure 2:
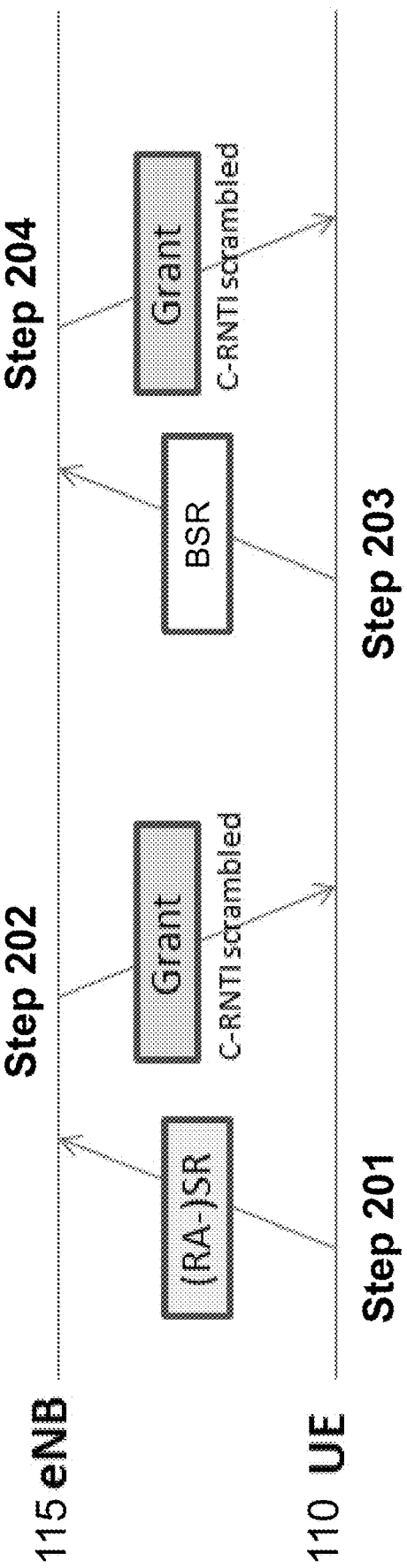
FIG. 2 is a signal flow diagram of the initiation of uplink transmission by a UE, in accordance with certain embodiments.

FIG. 2 is a signal flow diagram of the initiation of UL transmission by UE 110, in accordance with certain embodiments. To start UL transmission (e.g., LTE UL transmission), UE 110 must request UL resources from network node 115. At step 201, UE 110 sends a scheduling request (SR) to network node 115. At step 202, network node 115 grants UL resources to UE 110. The grant of UL resources may be scrambled with Cell Radio Network Temporary Identifier (C-RNTI). At step 203, UE 110 sends a buffer status report (BSR) to network node 115 using the UL resource(s) granted at step 202. The BSR indicates an amount of data available for transmission in an uplink buffer associated with UE 110. Buffer status reporting for LTE data/logical channels (Uu interface) is specified in 3GPP TS 36.321 v12.2.1. In LTE, buffer status reporting is done by means of MAC control elements comprising a (sub-)header part and a payload part. At step 204, network node 115 grants UL resources to UE 110. The grant of UL resources is scrambled with C-RNTI.

Figure 3:
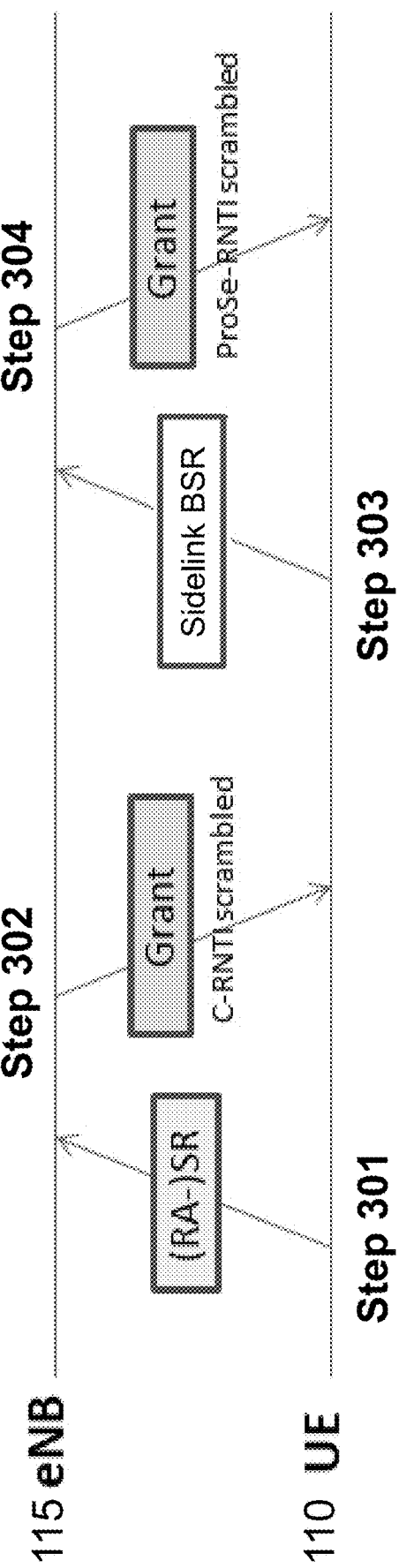
FIG. 3 is a signal flow diagram of the initiation of sidelink communication transmission by a UE, in accordance with certain embodiments.

FIG. 3 is a signal flow diagram of initiation of sidelink communication transmission, in accordance with certain embodiments. As described above, to start sidelink communication in mode 1, UE 110 must request resources from network node 115. At step 301, UE 110 sends a SR to network node 115. At step 302, network node 115 grants UL resources to UE 110. The grant of UL resources may be scrambled with Cell Radio Network Temporary Identifier (C-RNTI). At step 303, UE 110 sends a sidelink BSR to network node 115 using the UL resource(s) granted at step 302. At step 304, network node 115 grants UL resources to UE 110. The sidelink BSR indicates an amount of sidelink data available for transmission in a sidelink buffer of the wireless device. In this case, the grant of UL resources may be scrambled with Sidelink-Radio Network Temporary Identifier (SL-RNTI) instead of C-RNTI described above in relation to FIG. 2.

According to existing implementations, when UE 110 has both UL data (e.g., LTE data) and sidelink data in buffer for transmission, UE 110 has to request/allocate resources for them serially. For example, in such a case UE 110 would first have to execute steps 201-204 described above in relation to FIG. 2 for uplink, and then execute steps 301-304 described above in relation to FIG. 3 for sidelink. Such a solution may have certain deficiencies. For example, requiring UE 110 to serially request/allocate resources may increase service delay of sidelink. As described in more detail below, the present disclosure contemplates various embodiments that may advantageously reduce or eliminate the service delay associated with requesting/allocating resources for UL and sidelink data in buffer for transmission.

In certain embodiments, a wireless device, such as UE 110, may send a scheduling request to a network node, such as network node 115. UE 110 may receive, from network node 115 in response to the scheduling request, a grant of uplink resources. UE 110 may determine whether the granted uplink resources are at least equal to or larger than the resources required for transmission of both a buffer status report (BSR) and a sidelink BSR. Upon determining that the granted uplink resources are at least equal to or larger than the resources required for transmission of both the BSR and the sidelink BSR, UE 110 may communicate the BSR and the sidelink BSR to network node 115 in a single medium access control (MAC) protocol data unit (PDU). Upon determining that the granted uplink resources are not at least equal to or larger than the resources required for transmission of both the BSR and the sidelink BSR, the wireless device may communicate the BSR and sidelink BSR in a various formats, thereby enabling joint allocation of UL and sidelink resources and eliminating the service delay associated with requesting/allocating resources for UL and sidelink data in buffer for transmission. In certain embodiments, network node 115 may: receive a scheduling request from UE 110; send, in response to receiving the scheduling request, a grant of uplink resources to UE 110; and receive, from UE 110 in response to the grant of uplink resources, a BSR and a sidelink BSR in a single MAC PDU.

FIG. 4 is a signal flow diagram of the initiation of UL and sidelink transmission using a BSR and a sidelink BSR, in accordance with certain embodiments. At step 401, UE 110 sends a SR to network node 115. At step 402, network node 115 grants UL resources to UE 110. The grant of UL resources may be scrambled with Cell Radio Network Temporary Identifier (C-RNTI). In certain embodiments, the resources granted by network node 115 at step 402 may be enough for the transmission of BSR and sidelink BSR. For example, the resources granted by network node 115 at step 402 may be at least equal to or larger than the resources required for transmission by UE 110 of both the BSR and the sidelink BSR. In such a case, at step 403 UE 110 transmits a BSR and a sidelink BSR within a single MAC PDU. At step 404, network node 115 grants resources for UL and sidelink, respectively.

FIG. 5 is a signal flow diagram of the initiation of UL and sidelink transmission using a truncated BSR and a sidelink BSR, in accordance with certain embodiments. At step 501, UE 110 sends a SR to network node 115. At step 502, network node 115 grants UL resources to UE 110. The grant of UL resources may be scrambled with Cell Radio Network Temporary Identifier (C-RNTI). In certain embodiments, the granted uplink resources may be enough for the transmission of BSR, but not enough for BSR and sidelink BSR. In such a case, at step 503 UE 110 may replace the BSR with a truncated BSR and transmit the truncated BSR and sidelink BSR with a single MAC PDU. At step 504, network node 115 may grant resources for further buffer status reporting (i.e., BSR and/or sidelink BSR) that could not be accommodated at step 503, and UL data, if any. Based on receiving a truncated BSR, network node 115 may determine that UE 110 needs further resources to report buffer status for logical channels of logical channel groups for which buffer status was not reported yet. Network node 115 may adjust the amount of resources granted for UL data over an interface, such as the Uu interface, at step 504 to accommodate the further buffer status reporting which could not be accommodated at step 503.

Figure 6:
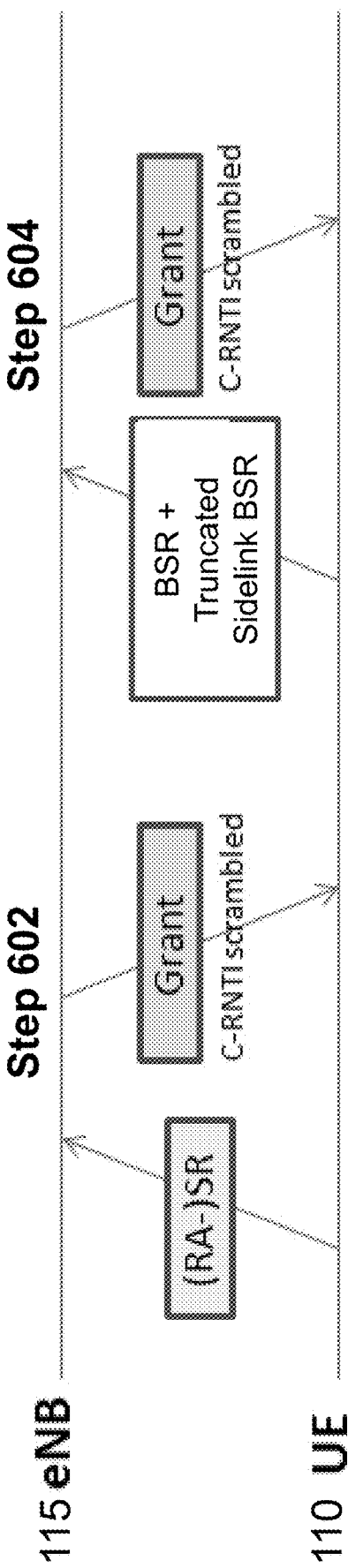
FIG. 6 is a signal flow diagram of the initiation of uplink and sidelink transmission using a truncated BSR and a sidelink BSR, in accordance with certain embodiments.

FIG. 6 is a signal flow diagram of the initiation of uplink and sidelink transmission using a BSR and a truncated sidelink BSR, in accordance with certain embodiments. At step 601, UE 110 sends a SR to network node 115. At step 602, network node 115 grants UL resources to UE 110. The grant of UL resources may be scrambled with Cell Radio Network Temporary Identifier (C-RNTI). As described above, in certain embodiments the granted uplink resources may be enough for the transmission of BSR, but not enough for BSR and sidelink BSR. In certain embodiments, UE 110 may replace the sidelink BSR with a truncated sidelink BSR at step 603. At step 604, network node 115 may grant resources for further buffer status reporting (i.e., BSR and/or sidelink BSR) that could not be accommodated at step 603, and UL data, if any. Based on receiving the truncated sidelink BSR, network node 115 may determine that UE 110 needs further resources to report sidelink buffer status for logical channels of logical channel groups for which buffer status was not reported yet. Network node 115 may adjust the amount of resources granted for sidelink data at step 604 to accommodate the further buffer status reporting which could not be accommodated at step 603.

Figure 7:
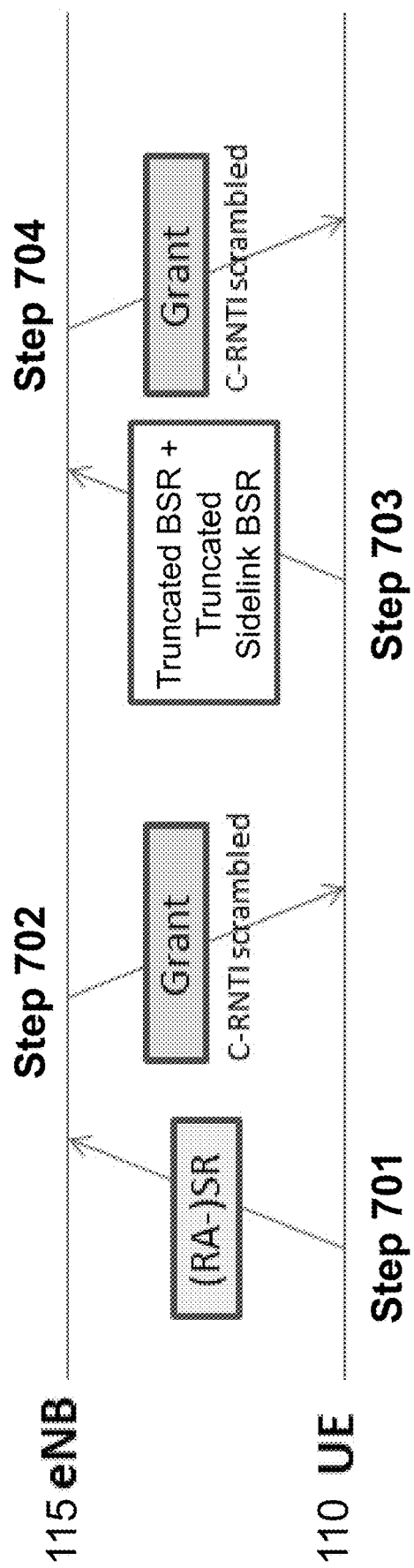
FIG. 7 is a signal flow diagram of the initiation of uplink and sidelink transmission using a truncated BSR and a truncated sidelink BSR, in accordance with certain embodiments.

FIG. 7 is a signal flow diagram of the initiation of uplink and sidelink transmission using a truncated BSR and a truncated sidelink BSR, in accordance with certain embodiments. At step 701, UE 110 sends a SR to network node 115. At step 702, network node 115 grants UL resources to UE 110. The grant of UL resources may be scrambled with Cell Radio Network Temporary Identifier (C-RNTI). In certain embodiments, replacing only BSR or sidelink BSR with a truncated BSR or truncated sidelink BSR, respectively, may not be sufficient to fit buffer status reports for both LTE data/logical channels (Uu interface) and sidelink data/logical channels in a single MAC PDU. In such a case, UE 110 may replace both BSR and sidelink BSR with a truncated BSR and a truncated sidelink BSR, respectively.

In certain embodiments, the resources granted at step 702 may be enough for the transmission of BSR, but not enough for BSR and sidelink BSR. In such a case, UE 110 may estimate and/or determine an amount of additional space which will be needed to include the sidelink BSR in a subsequent uplink transmission. UE 110 may increase the amount of data reported to be available for transmission by the estimated and/or determined amount to enable network node 115 to grant enough UL resources at step 704 for the successful inclusion and transmission of both the sidelink BSR and the data available for transmission reported for the logical channels of the logical channel groups for which buffer status was reported. For example, UE 110 may determine an amount of additional resources needed to include the sidelink BSR in a subsequent uplink transmission. UE 110 may report, to network node 115, an increased amount of data available for transmission, the increased amount of data available for transmission including the estimated and/or determined amount of additional resources needed to include the sidelink BSR in the subsequent uplink transmission. UE 110 may communicate, in the subsequent uplink transmission, the sidelink BSR and the amount of data reported to be available for transmission.

Figure 8:
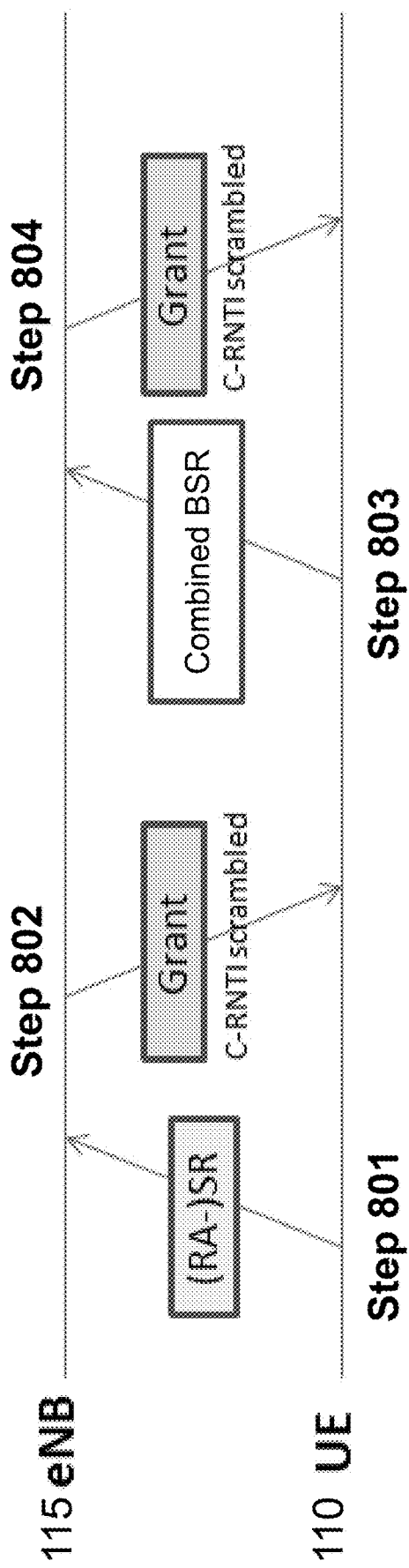
FIG. 8 is a signal flow diagram of the initiation of uplink and sidelink transmission using a combined BSR, in accordance with certain embodiments.

FIG. 8 is a signal flow diagram of the initiation of uplink and sidelink transmission using a combined BSR, in accordance with certain embodiments. At step 801, UE 110 sends a SR to network node 115. At step 802, network node 115 grants UL resources to UE 110. The grant of UL resources may be scrambled with Cell Radio Network Temporary Identifier (C-RNTI). In certain embodiments, buffer status may be reported for both LTE logical channels (Uu interface) and sidelink logical channels with a combined BSR. The combined BSR may include information about buffer status for both types of logical channels. By reporting buffer status using a combined BSR, the overhead of combined buffer status reporting for UL data/logical channels (Uu interface) and sidelink data/logical channels may be advantageously reduced. As described above, buffer status reporting may be done by means of MAC control elements comprising a (sub-)header part and a payload part. With a combined BSR, buffer status reporting for both LTE data/logical channels and ProSe data/logical channels may only require one (sub-header) component instead of one sub-header component for BSR and one for sidelink BSR.

Figure 9:
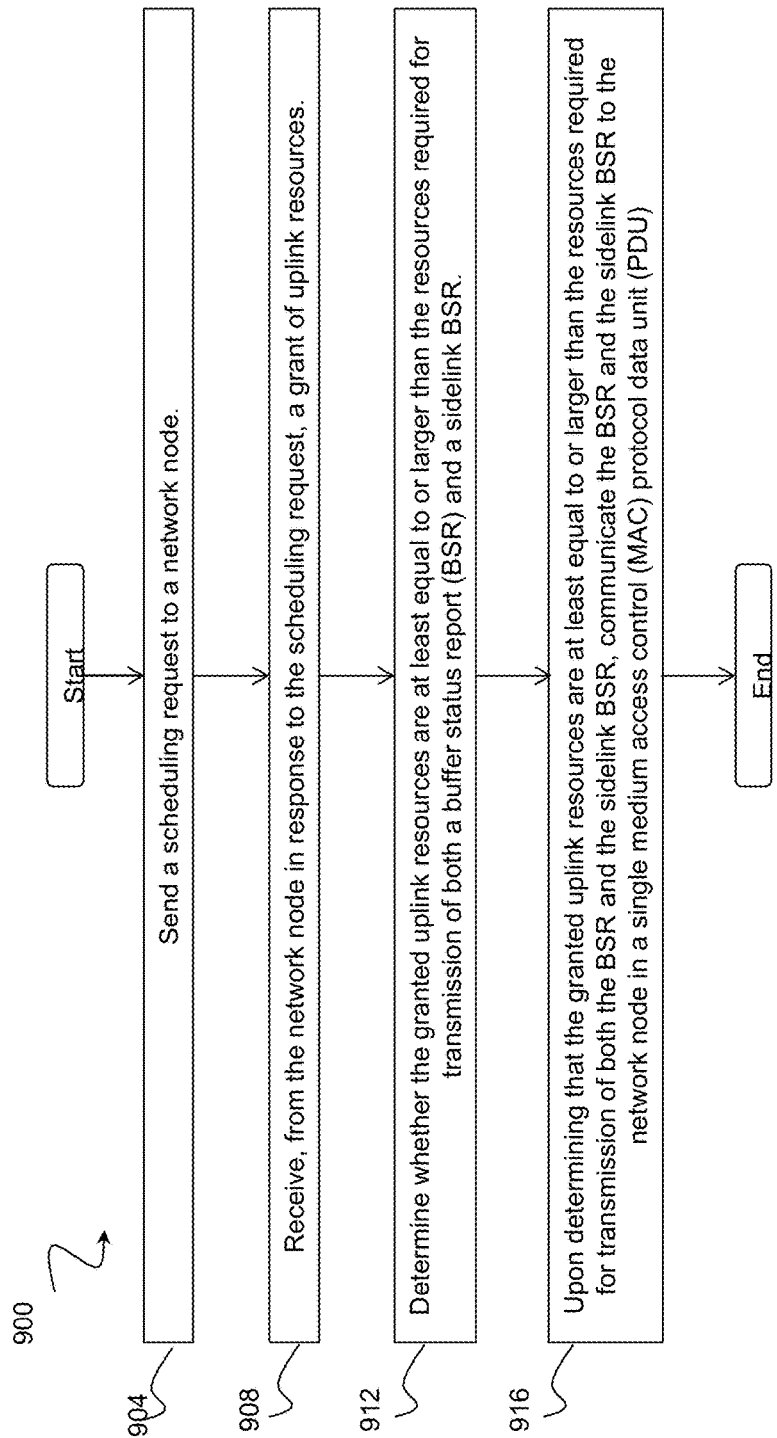
FIG. 9 is a flow chart of a method in a wireless device, in accordance with an embodiment.

FIG. 9 is a flow chart of a method 900 in a wireless device, in accordance with an embodiment. The method begins at step 904, where the wireless device sends a scheduling request to a network node. At step 908, the wireless device receives, from the network node in response to the scheduling request, a grant of uplink resources. At step 912, the wireless device determines whether the granted uplink resources are at least equal to or larger than the resources required for transmission of both a BSR and a sidelink BSR. In certain embodiments, the BSR may indicate an amount of data available for transmission in an uplink buffer associated with the wireless device, and the sidelink BSR may indicate an amount of sidelink data available for transmission in a sidelink buffer of the wireless device.

At step 916, upon determining that the granted uplink resources are at least equal to or larger than the resources required for transmission of both the BSR and the sidelink BSR, the wireless device communicates the BSR and the sidelink BSR to the network node in a single MAC PDU. In certain embodiments, the method may further comprise upon determining that the granted uplink resources are not at least equal to or larger than the resources required for transmission of both the BSR and the sidelink BSR, communicating the BSR and a truncated sidelink BSR to the network node in a single MAC PDU. The method may further comprise upon determining that the granted uplink resources are not at least equal to or larger than the resources required for transmission of both the BSR and the sidelink BSR, communicating a truncated BSR and the sidelink BSR to the network node in a single MAC PDU. The method may further comprise upon determining that the granted uplink resources are not at least equal to or larger than the resources required for transmission of both the BSR and the sidelink BSR, communicating a truncated BSR and a truncated sidelink BSR to the network node in a single MAC PDU.

In certain embodiments, the method may further comprise upon determining that the granted uplink resources are not at least equal to or larger than the resources required for transmission of both the BSR and the sidelink BSR, determining an amount of additional resources needed to include the sidelink BSR in a subsequent uplink transmission. The method may further comprise reporting, to the network node, an increased amount of data available for transmission, the increased amount of data available for transmission including the determined amount of additional resources needed to include the sidelink BSR in the subsequent uplink transmission, and communicating, in the subsequent uplink transmission, the sidelink BSR and the amount of data reported to be available for transmission. Communicating the BSR and the sidelink BSR to the network node in a single MAC PDU may comprise communicating a combined BSR. The combined BSR may comprise a single sub-header component and indicate buffer status for both LTE logical channels and sidelink logical channels.

Figure 10:
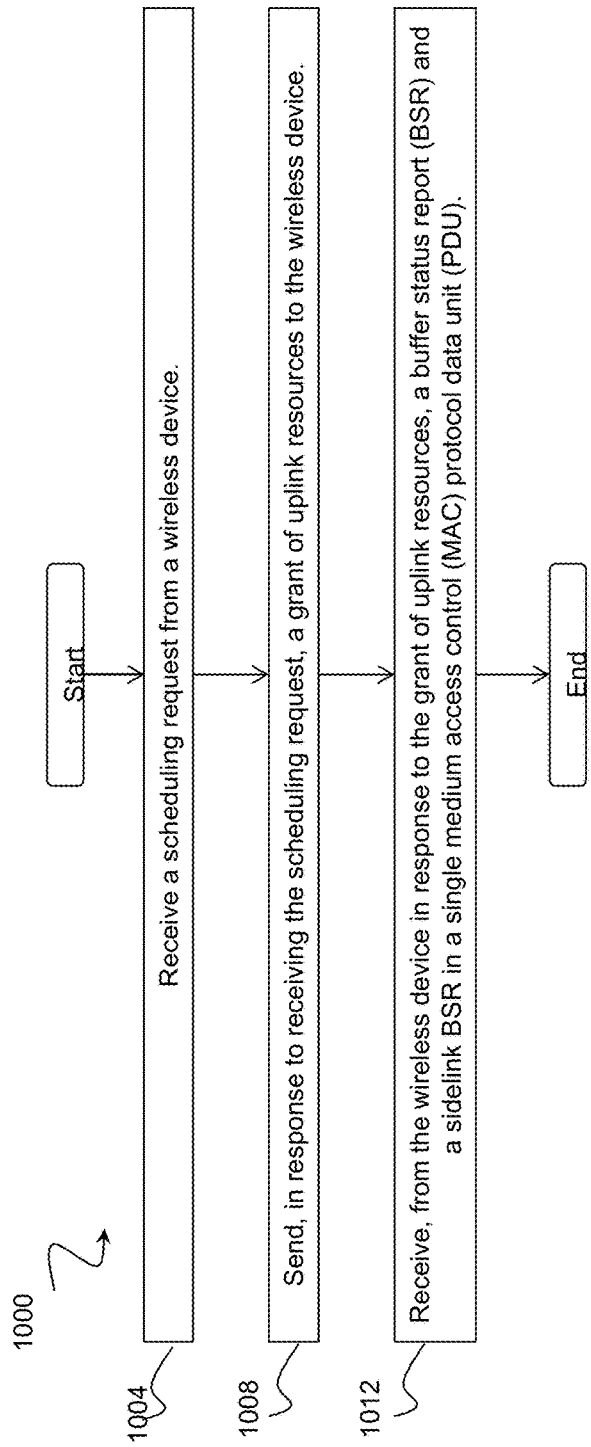
FIG. 10 is a flow chart of a method in a network node, in accordance with an embodiment.

FIG. 10 is a flow chart of a method 1000 in a network node, in accordance with an embodiment. The method begins at step 1004, where the network node receives a scheduling request from a wireless device. At step 1008, the network node sends, in response to receiving the scheduling request, a grant of uplink resources to the wireless device. In certain embodiments, the granted uplink resources may be at least equal to or larger than the resources required for transmission by the wireless device of both a BSR and a sidelink BSR. In certain embodiments, the granted uplink resources are not at least equal to or larger than the resources required for transmission by the wireless device of both the BSR and the sidelink BSR. The BSR may indicate an amount of data available for transmission in an uplink buffer associated with the wireless device, and the sidelink BSR may indicate an amount of sidelink data available for transmission in a sidelink buffer of the wireless device.

At step 1012, the network node receives, from the wireless device in response to the grant of uplink resources, a BSR and a sidelink BSR in a single MAC PDU. In some embodiments, receiving the BSR and the sidelink BSR in a single MAC PDU may comprise receiving a combined BSR. The combined BSR may comprise a single sub-header component and indicate buffer status for both LTE logical channels and sidelink logical channels. In certain embodiments, the granted uplink resources may not be at least equal to or larger than the resources required for transmission by the wireless device of both the BSR and the sidelink BSR, and the received sidelink BSR may comprise a truncated sidelink BSR. The truncated sidelink BSR may indicate to the network node that the wireless device needs additional resources to report buffer status for one or more logical channels of logical channel groups for which buffer status was not reported. The method may further comprise granting an amount of resources adjusted to allow the wireless device to report buffer status for the one or more logical channels of logical channel groups for which buffer status was not reported.

In certain embodiments, the granted uplink resources may not be at least equal to or larger than the resources required for transmission by the wireless device of both the BSR and the sidelink BSR, and the received BSR may comprise a truncated BSR. The truncated BSR may indicate to the network node that the wireless device needs additional resources to complete buffer status reporting. In some embodiments, the granted uplink resources may not be at least equal to or larger than the resources required for transmission of both the BSR and the sidelink BSR, the received BSR may comprise a truncated BSR, and the received sidelink BSR may comprise a truncated sidelink BSR.

In certain embodiments, the granted uplink resources may not be at least equal to or larger than the resources required for transmission of both the BSR and the sidelink BSR. The method may further comprise receiving a report from the wireless device indicating an amount of data available for transmission, the amount of data available for transmission may be increased based on an amount of additional resources determined by the wireless device to be needed to include the sidelink BSR in a subsequent uplink transmission. The method may further comprise granting sufficient uplink resources so that the wireless device can include both the sidelink BSR and the amount of data reported to be available for transmission.

Figure 11:
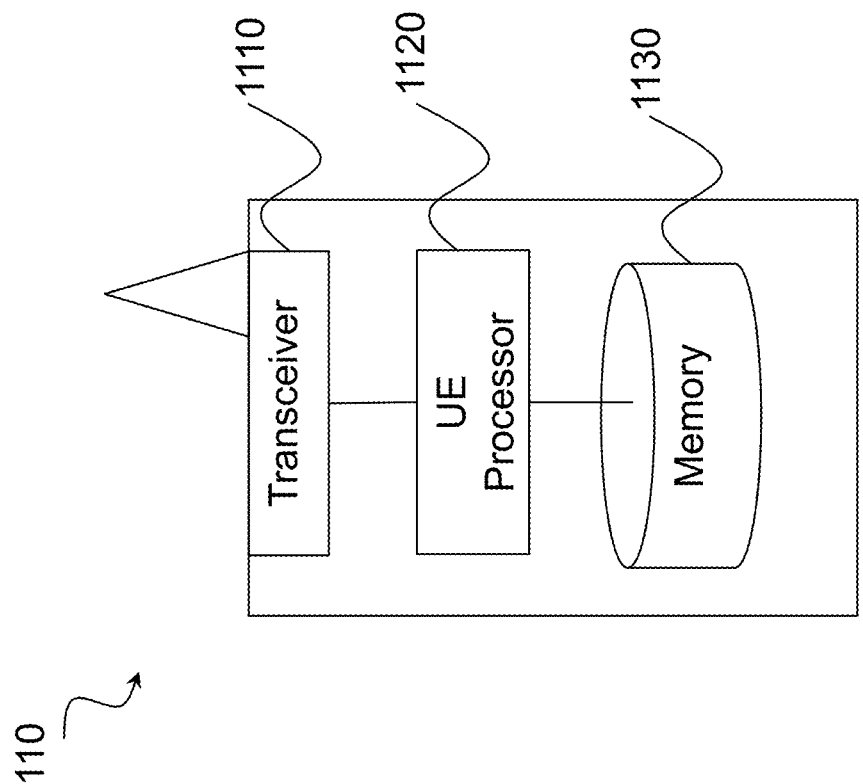
FIG. 11 is a block schematic of an exemplary wireless device, in accordance with certain embodiments.

FIG. 11 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1110, processor 1120, and memory 1130. In some embodiments, transceiver 1110 facilitates transmitting wireless signals to and receiving wireless signals from network node 115 (e.g., via an antenna), processor 1120 executes instructions to provide some or all of the functionality described above as being provided by wireless device 110, and memory 1130 stores the instructions executed by processor 1120.

Processor 1120 may include any suitable combination of hardware and software implemented in one or more modules to execute instructions and manipulate data to perform some or all of the described functions of wireless device 110. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 11 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may determine whether the granted uplink resources are at least equal to or larger than the resources required for transmission of both a BSR and a sidelink BSR. As another example, the determining module may determine an amount of additional resources needed to include the sidelink BSR in a subsequent uplink transmission. The determining module may include or be included in processor 1120. The determining module may include analog and/or digital circuitry configured to perform any of the functions of the determining module and/or processor 1120. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may send a scheduling request to a network node. As another example, the communication module may communicate the BSR and the sidelink BSR to the network node in a single MAC PDU. As another example, the communication module may communicate the BSR and a truncated sidelink BSR to the network node in a single MAC PDU. As yet another example, the communication module may communicate a truncated BSR and the sidelink BSR to the network node in a single MAC PDU. As a further example, the network node may communicate a truncated BSR and a truncated sidelink BSR to the network node in a single MAC PDU. In certain embodiments, the communication module may report an increased amount of data available for transmission, the increased amount of data available for transmission including a determined amount of additional resources needed to include the sidelink BSR in a subsequent uplink transmission. The communication module may communicate, in the subsequent uplink transmission, the sidelink BSR and the amount of data reported to be available for transmission. The communication module may include a transmitter and/or a transceiver, such as transceiver 1110. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive, from a network node in response to a scheduling request, a grant of uplink resources. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 12:
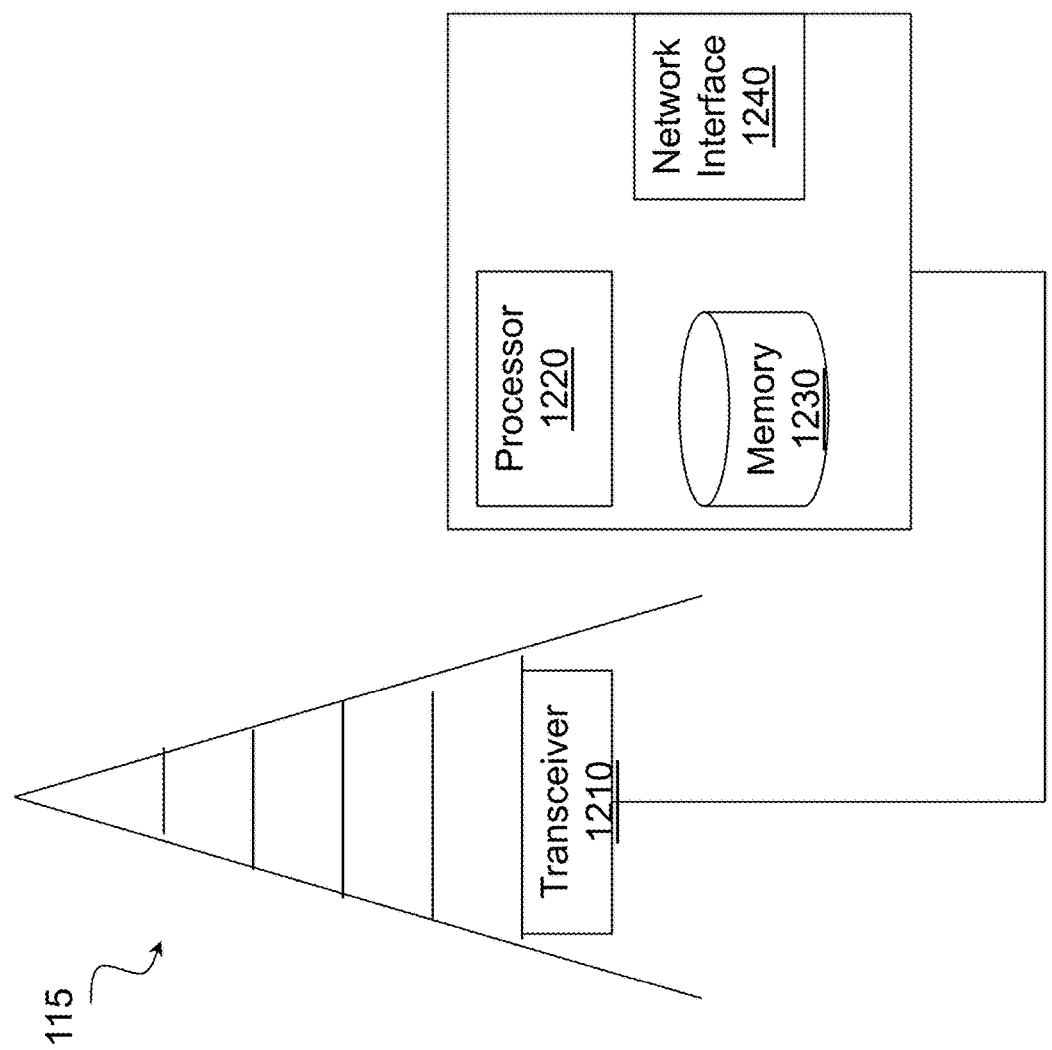
FIG. 12 is a block schematic of an exemplary network node, in accordance with certain embodiments.

FIG. 12 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1210, processor 1220, memory 1230, and network interface 1240. In some embodiments, transceiver 1210 facilitates transmitting wireless signals to and receiving wireless signals from wireless device 110 (e.g., via an antenna), processor 1220 executes instructions to provide some or all of the functionality described above as being provided by a network node 115, memory 1230 stores the instructions executed by processor 1220, and network interface 1240 communicates signals to backend network components, such as a gateway, switch, router, Internet, Public Switched Telephone Network (PSTN), core network nodes 130, radio network controllers 120, etc.

Processor 1220 may include any suitable combination of hardware and software implemented in one or more modules to execute instructions and manipulate data to perform some or all of the described functions of network node 115. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for network node 115, send output from network node 115, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1220 of FIG. 12. In certain embodiments, the functions of two or more of the various modules may be combined into a single module.

The determining module may perform the processing functions of network node 115. For example, the determining module may grant an amount of resources adjusted to allow a wireless device to report buffer status for one or more logical channels of logical channel groups for which buffer status was not reported. As another example, the determining module may grant sufficient uplink resources so that the wireless device can include both the sidelink BSR and an amount of data reported to be available for transmission. The determining module may include or be included in processor 1220. The determining module may include analog and/or digital circuitry configured to perform any of the functions of the determining module and/or processor 1220. The functions of the determining module described above may, in certain embodiments, be performed in one or more distinct modules.

The communication module may perform the transmission functions of network node 115. The communication module may transmit messages to one or more of wireless devices 110. For example, the communication module may send, in response to receiving a scheduling request, a grant of uplink resources to the wireless device. The communication module may include a transmitter and/or a transceiver, such as transceiver 1210. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may receive a scheduling request from a wireless device. As another example, the receiving module may receive, from the wireless device in response to a grant of uplink resources, a BSR and a sidelink BSR in a single MAC PDU. As yet another example, the receiving module may receive a report from the wireless device indicating an amount of data available for transmission, the amount of additional data available for transmission increased based on an amount of additional resources determined by the wireless device to be needed to include the sidelink BSR in a subsequent uplink transmission. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 12 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 13:
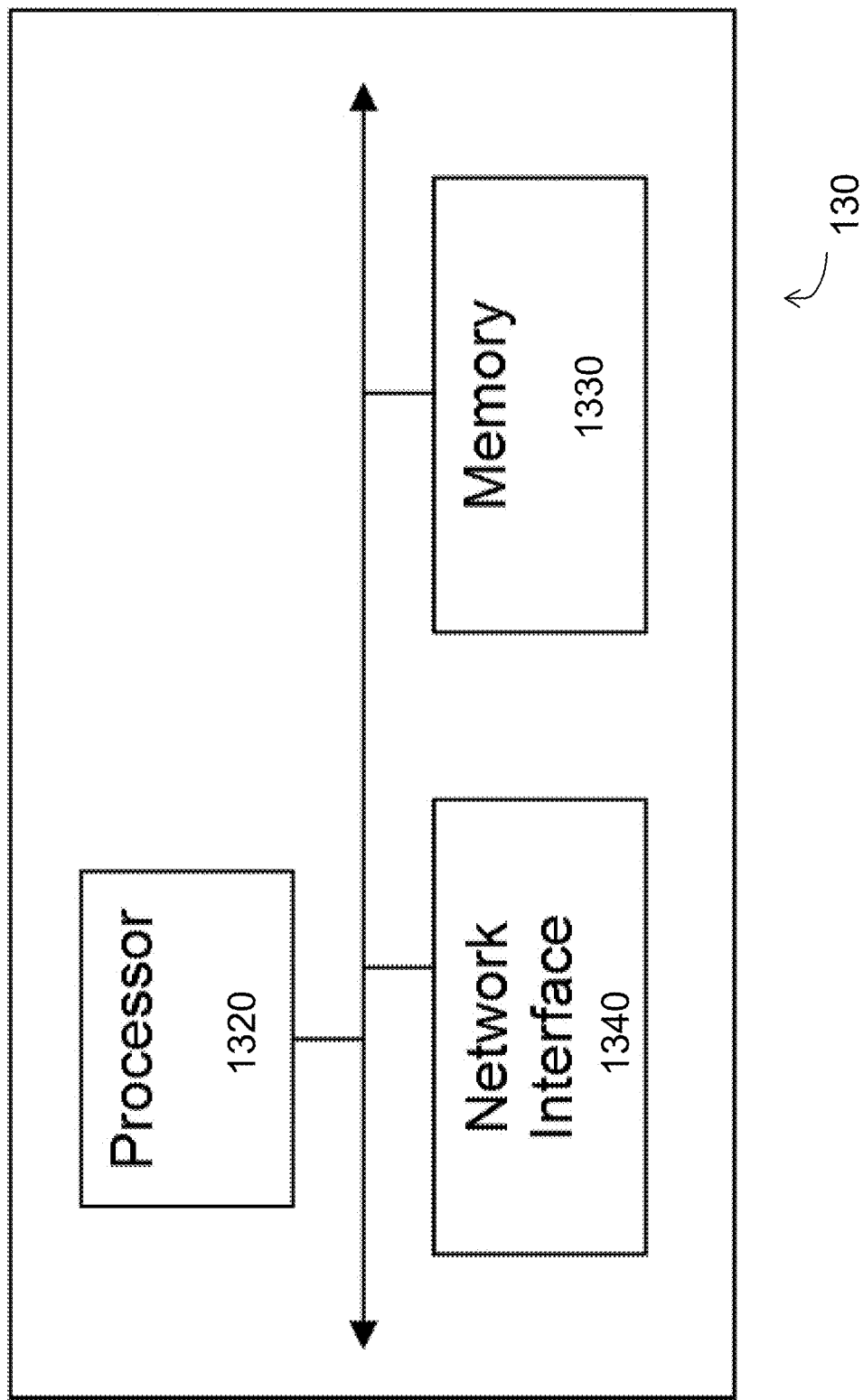
FIG. 13 is a block schematic of an exemplary radio network controller or core network node, in accordance with certain embodiments.

FIG. 13 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 include processor 1320, memory 1330, and network interface 1340. In some embodiments, processor 1320 executes instructions to provide some or all of the functionality described above as being provided by the network node, memory 1330 stores the instructions executed by processor 1320, and network interface 1340 communicates signals to any suitable node, such as a gateway, switch, router, Internet, Public Switched Telephone Network (PSTN), network nodes 115, radio network controllers or core network nodes 130, etc.

Processor 1320 may include any suitable combination of hardware and software implemented in one or more modules to execute instructions and manipulate data to perform some or all of the described functions of the radio network controller or core network node 130. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BSR Buffer Status Report
C-RNTI Cell-Radio Network Temporary Identifier
CH Cluster Head
D2D Device-to-device
DRX Discontinuous Reception
eNB Enhanced NodeB
LTE Long Term Evolution
MAC Medium Access Control
PDU Protocol Data Unit
ProSe Proximity Services
PSS Primary Synchronization Signal
SL-RNTI Sidelink Radio Network Temporary Identifier
SR Scheduling Request
SSS Secondary Synchronization Signal
UE User Equipment
UL Uplink

The invention claimed is:
1. A method in a wireless device, comprising:
receiving, from a network node, a grant of uplink resources;
determining whether the granted uplink resources are at least equal to or larger than the resources required for transmission of both a buffer status report (BSR) and a sidelink BSR; and
upon determining that the granted uplink resources are not at least equal to or larger than the resources required for transmission of both the BSR and the sidelink BSR, truncating at least one of the BSR and the sidelink BSR for communication of the BSR and the sidelink BSR to the network node in a single medium access control (MAC) protocol data unit (PDU).

2. The method of claim 1, wherein truncating the at least one of the BSR and the sidelink BSR comprises truncating the sidelink BSR to generate a truncated sidelink BSR, and the method further comprises communicating the BSR and the truncated sidelink BSR to the network node in a single MAC PDU.

3. The method of claim 1, wherein truncating the at least one of the BSR and the sidelink BSR comprises truncating the BSR to generate a truncated BSR, and the method further comprises communicating the truncated BSR and the sidelink BSR to the network node in a single MAC PDU.

4. The method of claim 1, wherein truncating the at least one of the BSR and the sidelink BSR comprises truncating the BSR to generate a truncated BSR and truncating the sidelink BSR to generate a truncated sidelink BSR, and the method further comprises communicating the truncated BSR and the truncated sidelink BSR to the network node in a single MAC PDU.

5. The method of claim 1, further comprising upon determining that the granted uplink resources are not at least equal to or larger than the resources required for transmission of both the BSR and the sidelink BSR:
determining an amount of additional resources needed to include the sidelink BSR in a subsequent uplink transmission;
reporting, to the network node, an increased amount of data available for transmission, the increased amount of data available for transmission including the determined amount of additional resources needed to include the sidelink BSR in the subsequent uplink transmission; and
communicating, in the subsequent uplink transmission, the sidelink BSR and the increased amount of data reported to be available for transmission.

6. The method of claim 1, further comprising communicating a combined BSR, the combined BSR comprising a single sub-header component and indicating buffer status for both Long Term Evolution (LTE) logical channels and sidelink logical channels.

7. The method of claim 1, wherein:
the BSR indicates an amount of data available for transmission in an uplink buffer associated with the wireless device; and
the sidelink BSR indicates an amount of sidelink data available for transmission in a sidelink buffer of the wireless device.

8. A method in a network node, comprising:
sending, to a wireless device, a grant of uplink resources to the wireless device;
receiving, from the wireless device in response to the grant of uplink resources, a buffer status report (BSR) and a sidelink BSR in a single medium access control (MAC) protocol data unit (PDU), wherein at least one of the BSR and the sidelink BSR is truncated because the granted uplink resources are not at least equal to or larger than the resources required for transmission by the wireless device of both the BSR and the sidelink BSR, the BSR indicating to the network node that the wireless device needs additional resources to report buffer status for one or more logical channels of logical channel groups for which buffer status was not reported.

9. The method of claim 8, wherein:
the received sidelink BSR comprises a truncated sidelink BSR, the truncated sidelink BSR indicating to the network node that the wireless device needs additional resources to report buffer status for one or more logical channels of logical channel groups for which buffer status was not reported.

10. The method of claim 9, further comprising granting an amount of resources adjusted to allow the wireless device to report buffer status for the one or more logical channels of logical channel groups for which buffer status was not reported.

11. The method of claim 8, wherein the received BSR comprises a truncated BSR, the truncated BSR indicating to the network node that the wireless device needs additional resources to complete buffer status reporting.

12. The method of claim 8, wherein:
the received BSR comprises a truncated BSR; and
the received sidelink BSR comprises a truncated sidelink BSR.

13. The method of claim 8, wherein the method further comprises:
receiving a report from the wireless device indicating an amount of data available for transmission, the amount of data available for transmission increased based on an amount of additional resources determined by the wireless device to be needed to include the sidelink BSR in a subsequent uplink transmission; and
granting sufficient uplink resources so that the wireless device can include both the sidelink BSR and the amount of data reported to be available for transmission.

14. The method of claim 8, wherein receiving, from the wireless device in response to the grant of uplink resources, the BSR and the sidelink BSR in the single MAC PDU comprises receiving a combined BSR, the combined BSR comprising a single sub-header component and indicating buffer status for both Long Term Evolution (LTE) logical channels and sidelink logical channels.

15. The method of claim 8, wherein:
the BSR indicates an amount of data available for transmission in an uplink buffer associated with the wireless device; and
the sidelink BSR indicates an amount of sidelink data available for transmission in a sidelink buffer of the wireless device.

16. A wireless device, comprising:
a memory containing instructions; and
one or more processors configured, when executing said instructions, to:
receive, from a network node, a grant of uplink resources;
determine whether the granted uplink resources are at least equal to or larger than the resources required for transmission of both a buffer status report (BSR) and a sidelink BSR; and
upon determining that the granted uplink resources are not at least equal to or larger than the resources required for transmission of both the BSR and the sidelink BSR, truncate at least one of the BSR and the sidelink BSR for communication of the BSR and the sidelink BSR to the network node in a single medium access control (MAC) protocol data unit (PDU).

17. The wireless device of claim 16, wherein truncating the at least one of the BSR and the sidelink BSR comprises truncating the sidelink BSR to generate a truncated sidelink BSR, and wherein the one or more processors are further configured to:
communicate the BSR and the truncated sidelink BSR to the network node in a single MAC PDU.

18. The wireless device of claim 16, wherein truncating the at least one of the BSR and the sidelink BSR comprises truncating the BSR to generate a truncated BSR, and wherein the one or more processors are further configured to:
communicate the truncated BSR and the sidelink BSR to the network node in a single MAC PDU.

19. The wireless device of claim 16, wherein truncating the at least one of the BSR and the sidelink BSR comprises truncating the BSR to generate a truncated BSR and truncating the sidelink BSR to generate a truncated sidelink BSR, and wherein the one or more processors are further configured to:
communicate the truncated BSR and the truncated sidelink BSR to the network node in a single MAC PDU.

20. The wireless device of claim 16, wherein the one or more processors are further configured to, upon determining that the granted uplink resources are not at least equal to or larger than the resources required for transmission of both the BSR and the sidelink BSR:
determine an amount of additional resources needed to include the sidelink BSR in a subsequent uplink transmission;
report, to the network node, an increased amount of data available for transmission, the increased amount of data available for transmission including the determined amount of additional resources needed to include the sidelink BSR in the subsequent uplink transmission; and
communicate, in the subsequent uplink transmission, the sidelink BSR and the increased amount of data reported to be available for transmission.

21. The wireless device of claim 16, wherein the one or more processors are configured to communicate the BSR and the sidelink BSR to the network node in the single MAC PDU as a combined BSR, the combined BSR comprising a single sub-header component and indicating buffer status for both Long Term Evolution (LTE) logical channels and sidelink logical channels.

22. The wireless device of claim 16, wherein:
the BSR indicates an amount of data available for transmission in an uplink buffer associated with the wireless device; and
the sidelink BSR indicates an amount of sidelink data available for transmission in a sidelink buffer of the wireless device.

23. A network node, comprising:
a memory containing instructions; and
one or more processors configured, when executing said instructions, to:
send, to a wireless device, a grant of uplink resources to the wireless device;
receive, from the wireless device in response to the grant of uplink resources, a buffer status report (BSR) and a sidelink BSR in a single medium access control (MAC) protocol data unit (PDU), wherein at least one of the BSR and the sidelink BSR is truncated because the granted uplink resources are not at least equal to or larger than the resources required for transmission by the wireless device of both the BSR and the sidelink BSR, the BSR indicating to the network node that the wireless device needs additional resources to report buffer status for one or more logical channels of logical channel groups for which buffer status was not reported.

24. The network node of claim 23, wherein:
the received sidelink BSR comprises a truncated sidelink BSR, the truncated sidelink BSR indicating to the network node that the wireless device needs additional resources to report buffer status for one or more logical channels of logical channel groups for which buffer status was not reported.

25. The network node of claim 24, wherein the one or more processors are further configured to grant an amount of resources adjusted to allow the wireless device to report buffer status for the one or more logical channels of logical channel groups for which buffer status was not reported.

26. The network node of claim 23, wherein and the received BSR comprises a truncated BSR, the truncated BSR indicating to the network node that the wireless device needs additional resources to complete buffer status reporting.

27. The network node of claim 23, wherein:
the received BSR comprises a truncated BSR; and
the received sidelink BSR comprises a truncated sidelink BSR.

28. The network node of claim 23, wherein and the one or more processors are further configured to:
receive a report from the wireless device indicating an amount of data available for transmission, the amount of data available for transmission increased based on an amount of additional resources determined by the wireless device to be needed to include the sidelink BSR in a subsequent uplink transmission; and
grant sufficient uplink resources so that the wireless device can include both the sidelink BSR and the amount of data reported to be available for transmission.

29. The network node of claim 23, wherein the one or more processors configured to receive, from the wireless device in response to the grant of uplink resources, the BSR and the sidelink BSR in the single MAC PDU comprise one or more processors configured to receive a combined BSR, the combined BSR comprising a single sub-header component and indicating buffer status for both Long Term Evolution (LTE) logical channels and sidelink logical channels.

30. The network node of claim 23, wherein:
the BSR indicates an amount of data available for transmission in an uplink buffer associated with the wireless device; and
the sidelink BSR indicates an amount of sidelink data available for transmission in a sidelink buffer of the wireless device.

* * * * *